J. F. PRAY.
Wheel-Fasteners.

No. 150,187. Patented April 28, 1874.

Witnesses,

Inventor,
Joseph F. Pray

UNITED STATES PATENT OFFICE.

JOSEPH F. PRAY, OF BOSTON, MASSACHUSETTS, ASSIGNOR TO HIMSELF AND DANIEL A. JOHNSON, OF SAME PLACE.

IMPROVEMENT IN WHEEL-FASTENERS.

Specification forming part of Letters Patent No. 150,187, dated April 28, 1874; application filed March 20, 1874.

*To all whom it may concern:*

Be it known that I, JOSEPH F. PRAY, of Boston, in the county of Suffolk and State of Massachusetts, have invented certain Improvements in Securing Wheels to their Axles, of which the following is a full, clear, and exact description, reference being had to the accompanying drawings, making part of this specification, in which—

Figure 1:
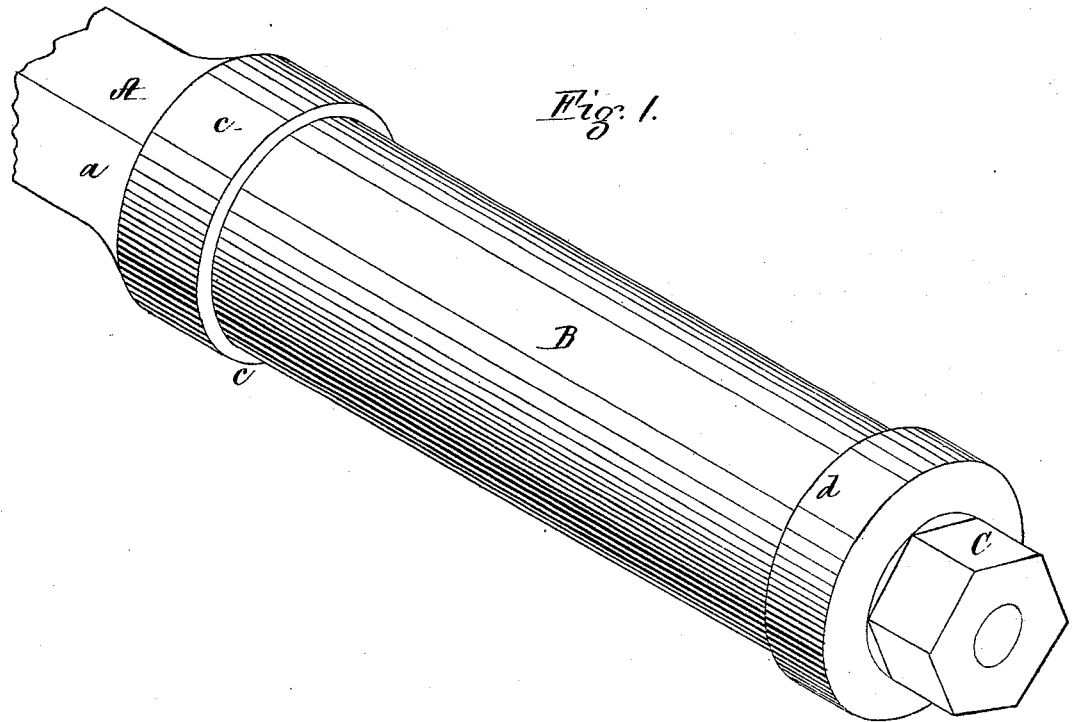
Figure 2:
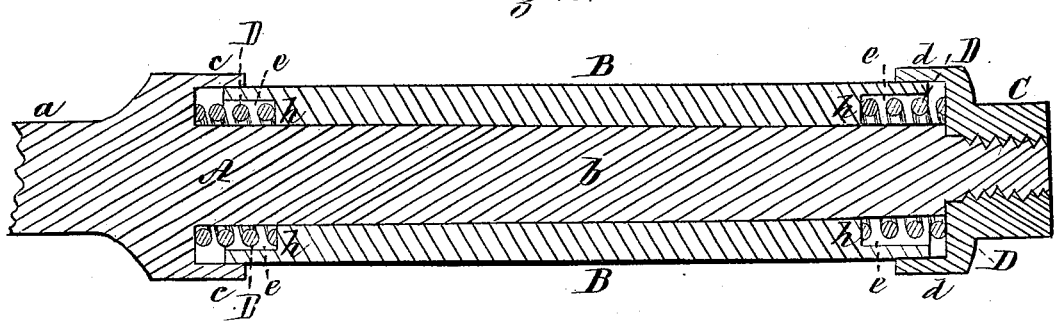

Figure 1 is a perspective view of an axle and its box made in accordance with my invention. Fig. 2 is a longitudinal section through the center of the same.

This invention relates to that method of securing wheels to their axles in which a spiral spring is employed at one or both ends of the axle-box, to prevent the rattling of the parts; and this invention consists in an axle-box provided with a recess at its end, which receives and keeps the spring in place, and serves as a chamber for containing the lubricating material, the movement of the spring causing it to be distributed evenly upon the axle, as required, while the washers heretofore used are entirely dispensed with. My invention also consists in the arrangement of spiral springs within opposite ends of the axle-box, which entirely prevents rattling of the parts. My invention furthermore consists in an axle provided with a flange at its inner end, which fits over the recessed end of the axle-box containing the spring, and thus prevents the escape of oil, precludes the entrance of dust, and relieves the axle in the event of its becoming cracked at the shoulder.

To enable others skilled in the art to understand and use my invention, I will proceed to describe the manner in which I have carried it out.

In the said drawings, A represents the axle, the main portion $a$ of which is square, and the outer portion circular in cross-section, forming a cylindrical journal, $b$, whose diameter is less than the thickness of the square or main portion. At the junction of the inner end of the journal with the square portion of the axle is a flange, $c$, a socket being thus formed for the reception of the inner end of the cylindrical axle-box B, which fits snugly therein. The outer end of the journal of the axle is provided with a screw-thread, over which turns a nut, C, having a flange, $d$, (similar to that at $c$,) which fits snugly over the outer end of the box B, the object of the flange on the axle and that on the nut being to prevent the entrance of dust within the box, each end of which is provided with a recess, $e$, for the reception of a stiff spiral spring, D, which is thus kept in place within the box, a shoulder, $h$, being formed in each end of the box for the end of the spring to bear on, the recesses $e$ in the box also serving as chambers for containing the oil or other lubricating material, and the flanges on the nut and axle also preventing its escape therefrom, while the compression and expansion of the springs, caused by the lateral movement of the box B on its axle, force the oil from the chambers, and serve to distribute it evenly over its surface.

One of the most important advantages resulting from this construction is, that no washers whatever are required, while at the same time all rattling of the parts is avoided.

A spring at one end only of the axle-box may be used; but this only partially prevents rattling. I therefore prefer to use two springs—one at each end of the box, as above described.

In the event of the axle becoming cracked at the shoulder, the box will bear on the inside of the flange $c$, thus relieving, in a measure, the strain on the axle.

I am aware that two spiral springs have been used for steadying the box upon the journal, but not at the ends of the box, as I have arranged them. By my arrangement of a spring next to the nut C, with a bearing thereupon, it is easier of access, and the recess becomes available as a chamber for holding the lubricant. I do not therefore claim, broadly, the use of the two spiral springs, but only when placed at each end of the box.

I claim—

The axle-box B, having a recess at each end for holding a spring, in combination with the springs D D, axle A, and nut C, having the flanges $c\ d$, all constructed to operate substantially as and for the purpose set forth.

Witness my hand this 14th day of March, A. D. 1874.

JOSEPH F. PRAY.

In presence of—
P. E. TESCHEMACHER,
N. W. STEARNS.